(12) United States Patent
Wagenseil et al.

(10) Patent No.: US 11,554,680 B2
(45) Date of Patent: Jan. 17, 2023

(54) INTERMEDIATE CIRCUIT AND VEHICLE-MOUNTED CHARGING CIRCUIT WITH INTERMEDIATE CIRCUIT

(71) Applicant: Vitesco Technologies GmbH, Regensburg (DE)

(72) Inventors: Veit Wagenseil, Munich (DE); Werner Lex, Munich (DE); Walter Schrod, Munich (DE)

(73) Assignee: Vitesco Technologies GmbH

( * ) Notice: Subject to any disclaimer, the term of this patent is extended or adjusted under 35 U.S.C. 154(b) by 0 days.

(21) Appl. No.: 17/765,988

(22) PCT Filed: Sep. 3, 2020

(86) PCT No.: PCT/EP2020/074595
§ 371 (c)(1),
(2) Date: Apr. 1, 2022

(87) PCT Pub. No.: WO2021/069151
PCT Pub. Date: Apr. 15, 2021

(65) Prior Publication Data
US 2022/0348093 A1    Nov. 3, 2022

(30) Foreign Application Priority Data
Oct. 7, 2019   (DE) .......................... 102019215306.2

(51) Int. Cl.
*B60L 53/22*   (2019.01)
*B60L 53/10*   (2019.01)
*H02J 7/02*    (2016.01)

(52) U.S. Cl.
CPC .............. *B60L 53/22* (2019.02); *B60L 53/11* (2019.02); *H02J 7/02* (2013.01); *H02J 2207/20* (2020.01)

(58) Field of Classification Search
CPC ...... B60L 53/20; B60L 53/22; B60L 2210/30; B60L 53/24; B60L 53/11; H02J 7/02; H02J 2207/20
(Continued)

(56) References Cited

U.S. PATENT DOCUMENTS 10,476,401 B2 * 11/2019 Kusch ..................... B60L 53/24
2004/0246755 A1 12/2004 Isii et al.
(Continued)

FOREIGN PATENT DOCUMENTS

| EP | 2892136 A1 | 7/2015 |
|---|---|---|
| WO | 2016105343 A1 | 6/2016 |
| WO | 2020064432 A1 | 4/2020 |

OTHER PUBLICATIONS

English Translation of Written Opinion for International Application No. PCT/EP2020/074595, dated Dec. 3, 2020, 10 pages.
(Continued)

*Primary Examiner* — Paul Dinh
(74) *Attorney, Agent, or Firm* — RatnerPrestia

(57) ABSTRACT

An intermediate circuit is equipped with a first terminal connection, which includes a neutral conductor connection, and with a first and a second intermediate circuit capacitor and a diode circuit. The intermediate circuit has configuration switches which in a first state connect the intermediate circuit capacitors to one another in series and in a second state connect the intermediate circuit capacitors to one another in parallel. The configuration switches are each designed as changeover switches, which bypass the diode circuit in the first state, wherein the neutral conductor connection is connected to the diode circuit. A vehicle-based charging circuit, which includes the intermediate circuit and a rectifier circuit, is also described.

13 Claims, 1 Drawing Sheet

(58) Field of Classification Search
USPC .......................................................... 320/109
See application file for complete search history.

(56) References Cited

U.S. PATENT DOCUMENTS

| | | | |
|---|---|---|---|
| 2021/0245611 A1* | 8/2021 | Pfeilschifter | ........... B60L 53/22 |
| 2021/0296922 A1* | 9/2021 | Sun | ........................... H02J 7/02 |
| 2022/0041074 A1* | 2/2022 | Pfeilschifter | ........... B60L 53/22 |

OTHER PUBLICATIONS

International Search Report and Written Opinion for International Application No. PCT/EP2020/074595, dated Dec. 3, 2020. with partial English translation, 11 pages.

International Search Report and Written Opinion for International Application No. PCT/EP2020/074595, dated Dec. 3, 2020. 16 pages (German).

German Examination Report for German Application No. 10 2019 215 306.2, dated Jun. 16, 2020, with English translation, 7 pages.

Papamanolis, P., et al., "22kW EV Battery Charger Allowing Full Power Delivery in 3-Phase as well as 1-Phase Operation", Proceedings of the 10th ICPE International Conference on Power Electronics (ICPE 2019—ECCE Asia), Bexco, Busan, Korea, May 27-30, 2019, 9 pages.

\* cited by examiner

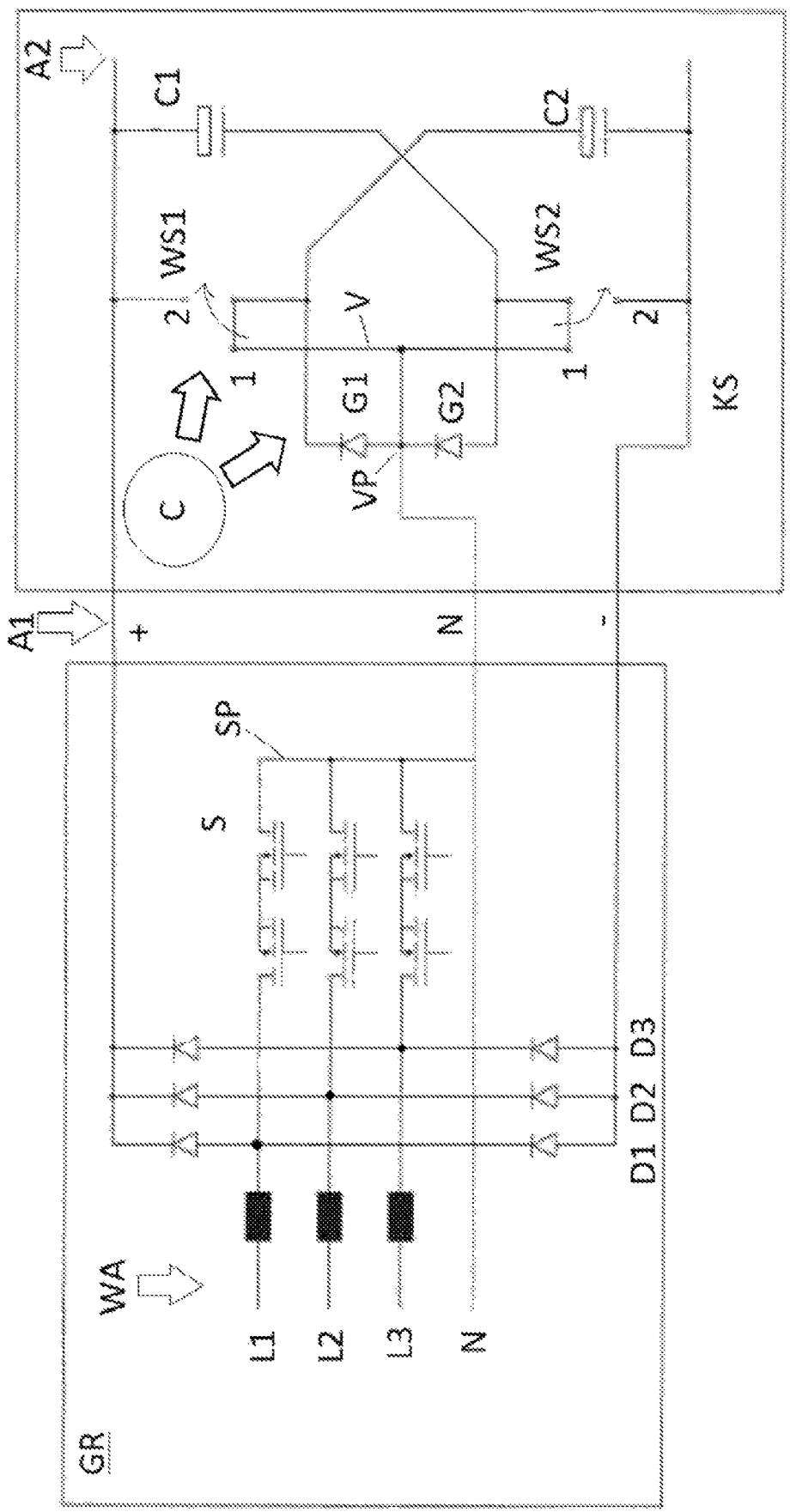

INTERMEDIATE CIRCUIT AND VEHICLE-MOUNTED CHARGING CIRCUIT WITH INTERMEDIATE CIRCUIT

CROSS REFERENCE TO RELATED APPLICATIONS

This application is the U.S. National Phase Application of PCT International Application No. PCT/EP2020/074595, filed Sep. 3, 2020, which claims priority to German Patent Application No. 10 2019 215 306.2, filed Oct. 7, 2019, the contents of such applications being incorporated by reference herein.

BACKGROUND OF THE INVENTION

It is known to drive motor vehicles by means of a battery as an energy store, wherein the electric drive comprises an electric machine. On the one hand, in order to generate a rotating field and generally to control the electric machine, semiconductors are required, in particular the semiconductor switches of a power converter, in order to be able to operate the electric machine by means of the direct voltage of the energy store.

Furthermore, it is generally known that vehicles with an electrical energy store, which is used in particular for traction, can be charged via a charging interface on the outside of the vehicle ("plug-in"). A charging station can be used as an AC source for charging, which may be three-phase or just single-phase, depending on the design. Since a higher rectified voltage occurs with three-phase charging than with single-phase charging, components such as intermediate circuit capacitances must be designed according to the higher voltage.

SUMMARY OF THE INVENTION

It is an aim of the invention to show a possibility with which the higher costs for intermediate circuit capacitances that are designed for relatively high voltages can be reduced and charging with a high level of efficiency can be made possible.

It is proposed to divide the intermediate circuit capacitor of a charging circuit into two capacitances and to connect them either in parallel (for a high capacitance at comparatively low voltages) or in series (at high voltages, in order to distribute the high rectified voltage to several capacitors) depending on the rectifier voltage. In order to be able to set the two states, two changeover switches are used, between which there is a diode circuit. The capacitors are cross-connected to the connecting points between the respective changeover switches and the diode circuit. In order to avoid a voltage drop and thus losses in the diode circuit, it is proposed to connect the changeover switches in such a way that the diode circuit is bypassed when the intermediate circuit capacitors are configured in series. (In a parallel configuration, the diode circuit is preferably not bypassed, especially not by the configuration switches). At the same time, the diode circuit enables a neutral conductor to be connected in order to be able to divert symmetrical components, for example in the case of three-phase charging.

The proposed circuit therefore permits the reduction of the losses in the case of a series connection by bypassing the diode circuit with a series configuration of the intermediate circuit capacitors, while at the same time asymmetrical components can be diverted via the diode circuit. It should be noted that when diverting asymmetries via the neutral conductor and the corresponding diodes, although a voltage drops across the diodes, the associated currents of the asymmetric components are small compared to the compensating currents through the intermediate circuit capacitors, so that the circuit prevents the main loss by conducting compensating currents of the intermediate circuit capacitors through the diode circuit.

An intermediate circuit with a corresponding form is therefore described. The intermediate circuit is in particular a vehicle-based intermediate circuit and may be part of an on-board vehicle electrical system. A vehicle-based charging device comprising the intermediate circuit can be provided. The intermediate circuit has a first terminal connection. If the charging device comprises the intermediate circuit but no rectifier circuit, then the first terminal connection can correspond to a DC charging connection of the charging device. This DC charging connection can be designed according to a standard for wired charging. As an alternative, a vehicle-based charging circuit comprising a rectifier circuit and the intermediate circuit can be provided. In this case, the rectifier circuit can have an AC voltage connection. The AC voltage connection is preferably designed in accordance with a standard for wired charging. The intermediate circuit is connected downstream of the rectifier circuit.

The intermediate circuit described here comprises a first terminal connection. This can be considered as the input connection of the intermediate circuit. The first terminal connection has a neutral conductor connection. In addition to the neutral conductor connection, the first terminal connection can have a positive and a negative terminal connection. The intermediate circuit comprises at least one first and one second intermediate circuit capacitor. The intermediate circuit is set up to connect said intermediate circuit capacitors to one another in parallel or in series. The intermediate circuit also comprises a diode circuit. The intermediate circuit has configuration switches. These allow a switchable parallel or series configuration or connection between the intermediate circuit capacitors. The configuration switches in a first state connect the intermediate circuit capacitors to one another in series. The configuration switches in a second state connect the intermediate circuit capacitors to one another in parallel. The configuration switches used here are each designed as changeover switches.

In addition to connecting the intermediate circuit capacitors to one another, which can be set using the configuration switches, the configuration switches also have the property of bypassing the diode circuit, specifically in particular in the first state (and preferably not in the second state). In the first state, the intermediate circuit capacitors are thus not only connected to one another (in series) via the diode circuit, but also via the configuration switches, so that the current (due to the forward voltage of the diode circuit) is essentially carried by the configuration switches. The bypassing makes it possible that a voltage drop does not occur at the diode circuit, with the result that the relevant power loss does not occur at the diodes. Instead, the configuration switches allow a direct connection, in particular without a significant voltage drop. In particular, the configuration switches allow a connection in the first state between the intermediate circuit capacitors without a voltage drop that would result from a p-n junction. The neutral conductor connection is connected to the diode circuit. Therefore, with two-phase charging, the neutral conductor connection can be used to conduct away asymmetrical components via the diode circuit.

The intermediate circuit and in particular the intermediate circuit capacitors are high-voltage components, that is to say they have a nominal voltage of at least 60 volts, at least 100 volts and preferably at least 400 volts or 800 volts. The components of the intermediate circuit are power components, with this particularly relating to the intermediate circuit capacitors, the configuration switches and the diodes. The diodes are also preferably designed as high-voltage components with the above-mentioned nominal voltage (as reverse voltage). The configuration switches are preferably electromechanical switches so that there is no voltage drop across numerous semiconductor switches. The configuration switches are in particular changeover switches. They can be represented by a changeover relay; that is to say the two states each correspond to a connection via two changeover contacts of the configuration switch.

The diode circuit preferably comprises a series connection of two diodes. Said diodes are connected to one another via a connecting point. The neutral conductor connection is preferably connected to the connecting point, in particular in a direct manner. A connection, which in the first state bypasses the diode circuit, can exist between the configuration switches. This (direct) connection is preferably also connected to the neutral conductor connection.

The first terminal connection has a positive potential (corresponding to a positive terminal connection) and a negative potential (corresponding to a negative terminal connection). One end of the first intermediate circuit capacitor is connected directly to the positive potential. One end of the second intermediate circuit capacitor is connected directly to the negative potential. The respective opposite ends of the intermediate circuit capacitors are connected to the configuration switches so that their switching position can affect the interconnection of the capacitors.

In the first state, the configuration switches preferably connect one end of the first intermediate circuit capacitor directly to one end of the second intermediate circuit capacitor via a direct connection between the configuration switches. The direct connection prevents the voltage drop across the diodes and bypasses the diode circuit in relation to both ends thereof. The ends of the intermediate circuit capacitors that are not directly connected to one of the two potentials are connected directly to one another by the configuration switches (without a connection between them) in the first state of the configuration switches. In the second state, the end of the respective intermediate circuit capacitors is connected directly to the potentials of the first terminal connection by the configuration switches. This applies to the ends of the intermediate circuit capacitors that are not connected directly to a potential of the first terminal connection but to the opposite end. This opposite end is connected directly to the other potential via one of the respective configuration switches. In this case, the first configuration switch connects the end of the second intermediate circuit capacitor (that is not connected to the negative potential) to the positive potential. The second configuration switch connects the end of the first intermediate circuit capacitor (that is not connected to the positive potential) to the negative potential of the first terminal connection.

The diode circuit preferably comprises a series connection of two diodes. Said diodes are connected to one another via a connecting point. The neutral conductor connection is connected directly to the connecting point. A direct connection can be provided in the intermediate circuit, via which the configuration switches (in the first state) are connected to one another. The direct connection via which the configuration switches are connected to one another in the first state (not in the second state) are preferably also connected directly to the connecting point (of the diode circuit) and/or to the neutral conductor connection.

A second terminal connection, which can lead to a rechargeable battery, for example, can be provided. In this case, the rechargeable battery is preferably not part of the intermediate circuit. The second terminal connection can therefore be referred to as a rechargeable battery connection or also as an on-board vehicle electrical system connection or as an output connection. The second terminal connection is connected to two potentials of the first terminal connection. In other words, the second terminal connection has two potentials (a positive and a negative), which are connected to the first terminal connection and its two potentials, respectively. In particular, the second terminal connection does not have a neutral conductor connection (in contrast to the first terminal connection). The negative potential of the first terminal connection is looped through to the negative potential of the second terminal connection. The positive potential of the first terminal connection is looped through to the positive potential of the second terminal connection. "Looping through" refers to the forwarding of a potential by means of a direct connection.

As mentioned, a vehicle-based charging circuit can be provided, which is in particular an AC charging circuit. The charging circuit comprises the intermediate circuit described here. The charging circuit also comprises a rectifier circuit. The rectifier circuit can be uncontrolled, or alternatively can be a controlled rectifier circuit. In particular, the rectifier circuit has a multiphase structure. The rectifier circuit has a multiphase, in particular three-phase, AC voltage connection. The rectifier circuit can thus have a three-phase structure.

The multiphase AC voltage connection of the rectifier circuit preferably has a neutral conductor connection. This neutral conductor connection of the rectifier circuit is connected, in particular directly, to the neutral conductor connection of the intermediate circuit. The neutral conductor connection can also be connected to a star point of the rectifier circuit. The rectifier circuit preferably has a multiphase structure. The rectifier circuit is set up for single-phase and multiphase operation. In particular, the rectifier circuit is designed for three-phase operation. Furthermore, the rectifier circuit is preferably designed for single-phase operation, with one phase of the AC voltage connection being able to be connected to one phase, several phases or all phases, in particular via a corresponding phase connection switch. This distributes the charging power to the phases.

The rectifier circuit can have one diode half-bridge per phase. Alternatively, the rectifier circuit can have one controllable rectifier bridge per phase, for example a transistor half-bridge. Furthermore, the rectifier circuit can have load inductances which are interposed as series inductance between the diode half-bridges and the phase connections of the AC voltage connection. Each half-bridge comprises two switching elements or diodes, which are connected to one another via a connecting point. The connecting points of the diode half-bridges are referred to here below as the center point. A series inductance is provided between each center point and one of the phase connections.

The rectifier can thus be designed as an active rectifier circuit. If the inductances mentioned above are present, voltage converter functions result, with the result that the voltage applied to the first terminal connection of the intermediate circuit does not necessarily correspond to the rectified half-waves of the AC voltage connection. The rectifier circuit can be designed in particular as a power factor correction filter, for example as a Vienna filter.

The rectifier circuit can have a star point. Said star point is preferably connected to the neutral conductor connection of the intermediate circuit. The star point is also preferably connected to the neutral conductor connection of the rectifier circuit. Each phase can have one circuit, with said circuit connecting each center point to a common star point. This circuit can comprise in particular a switch, preferably a semiconductor switch or a plurality of semiconductor switches which are preferably connected to one another in anti-series, in particular if the semiconductor switches have a body diode. The center points of the diode half-bridges can each be connected to the common star point of the rectifier circuit via a semiconductor switch. In this case, the semiconductor switches form the above-mentioned circuit.

The rectifier circuit can be set up to be operated in a single-phase or multiphase manner. The configuration switches of the intermediate circuit are preferably set up to assume the first state during multiphase operation of the rectifier circuit. The configuration switches are also set up to assume the second state during single-phase operation of the rectifier circuit (that is to say when only one phase of the rectifier circuit is operated or when several or all phases of the rectifier circuit are operated with the same phase).

A controller which is connected to the configuration switches in a driving manner can be provided. The controller can have an input at which an operating state signal can be received. This operating state signal can be output by the rectifier circuit, for example. The operating state signal indicates whether the individual phases of the rectifier circuit are multiphase or whether single-phase operation prevails (single-phase operation means that either only one phase of the rectifier circuit is active or several or all phases of the rectifier circuit are active, but with the same phase signal or voltage received in the same phase). Alternatively, it is possible to provide a controller set up both to set the operating state of the rectifier circuit and to set the switching state of the configuration switches. In both cases, the controllers are designed in such a way that in single-phase operation (either received by the signal input or set by the controller itself), the configuration switches connect the intermediate circuit capacitors in parallel with one another, and in multiphase and in particular three-phase operation the configuration switches connect the intermediate circuit capacitors in series with one another, whereby in this case the configuration switches bypass the diode circuit and thus connect the intermediate circuit capacitors to one another directly and not via the diode circuit. In other words, the controller is set up to bypass the diode circuit by means of the configuration switches in the case of multiphase and in particular three-phase operation of the rectifier circuit.

In single-phase operation, an AC voltage is applied to one phase connection or to several phase connections (in parallel) and to the neutral conductor. In this case, the current flows via the diode bridges of the rectifier circuit and via the diode circuit of the intermediate circuit. However, since the power in single-phase operation is lower than in multiphase operation, the power loss at the diodes of the diode circuit of the intermediate circuit is not as significant as in three-phase operation, in which essentially no power loss occurs at the diode circuit.

BRIEF DESCRIPTION OF THE DRAWINGS

The FIGURE is used to provide a more detailed explanation of the intermediate circuit described here and the vehicle-based charging circuit described here.

DETAILED DESCRIPTION OF THE PREFERRED EMBODIMENTS

The right half of the FIGURE shows an intermediate circuit KS having a first terminal connection A1 and a second terminal connection A2. An on-board power supply branch and/or a rechargeable battery and/or an electric drive can be connected to the terminal connection A2. However, these are not part of the intermediate circuit. The first terminal connection A1 comprises a positive terminal connection +, corresponding to a positive potential, a negative terminal connection −, corresponding to a negative potential, and a neutral conductor connection N. The intermediate circuit KS has two changeover switches WS1, WS2, as well as a first intermediate circuit capacitor C1 and a second intermediate circuit capacitor C2.

The changeover switches, also known as configuration switches, have two switching positions 1 and 2. The FIGURE shows the circuit in switching position 1. In switching position 1, as shown, the first intermediate circuit capacitor C1 connected to the positive terminal connection + is connected in series with the second intermediate circuit capacitor C2 via the second configuration switch WS2 and the first configuration switch WS1 (in this order). The connection V connects the changeover switches WS1 and WS2 to one another. In this case, the center connections of the respective changeover switches WS1, WS2 are connected to one another via the connection V. A respective first pole of the two changeover switches WS1, WS2 corresponds to the first switch position 1 and the center connection is connected to the contact next to which the reference number 1 is located. The configuration switches each have a second pole that is connected directly to the positive and negative potentials or terminal connections of the first terminal connection A1. The first pole of each changeover switch is connected to the connection V; in other words, the respective first poles of the configuration switches WS1, WS2 are connected to one another (directly via the connection V). The second poles (next to the reference number 2) are directly connected to different potentials of the first terminal connection A1.

If the configuration switches WS1, WS2 are in the second state, then the center connections of the configuration switches are connected to the two potentials of the first terminal connection A1. In this case, the first intermediate circuit capacitor C1 is connected to the negative potential − when the configuration switch WS2 is in the second state and the first intermediate circuit capacitor C1 is connected to the positive potential + (of the first terminal connection) via the first configuration switch WS1. The capacitors are connected in parallel.

The intermediate circuit KS also comprises a diode circuit, which comprises two diodes G1, G2, which are connected to one another in series. The forward direction of the diode circuit and thus of the diodes leads from the first capacitor C1 to the second capacitor C2. The diode circuit is connected between the intermediate circuit capacitors C1 and C2. In the same way, the diode circuit is connected between the configuration switches WS1, WS2, in particular between the center connections of the configuration switches. The diodes G1, G2 of the diode circuit are connected to one another in series via a connecting point VP. The configuration switches WS1, WS2 and in particular their first poles (which in the first state are connected to the center connection or to the intermediate circuit capacitors) are connected to one another via the connection V. This connection V bypasses the diode circuit G1, G2 when the configuration switches WS1, WS2 are in the first state 1. This corresponds to the state shown. In the resulting series connection of the intermediate circuit capacitors C1, C2, the intermediate diode circuit G1, G1 is thus bypassed so that no forward voltage and no losses occur there.

A controller C is connected to the configuration switches WS1, WS2 in a driving manner. A neutral conductor connection N of the first terminal connection A1 is connected to the connecting point VP. In the same way, a neutral conductor connection N of the first terminal connection A1 is connected to the connection V, which connects the configuration switches or their first poles to one another. In particular, the controller C is set up to switch back and forth between a series and parallel state, with the series and parallel states having correspondences in the states of the configuration switches, as mentioned. The controller C is set up to switch the two configuration switches WS1, WS2 symmetrically. The controller C can switch the configuration switches depending on an operating signal that indicates the operating state of the upstream rectifier circuit GR (in short: rectifier).

The FIGURE also shows a rectifier GR, which is connected to the intermediate circuit via the first terminal connection of the latter. In this case, the rectifier can be stationary, for example part of a charging station, with the terminal connection A1 then being a charging connection of the vehicle in which the intermediate circuit is located. Furthermore, the rectifier GR can be arranged on the vehicle side like the intermediate circuit KS, so that an AC voltage connection of the rectifier GR is provided as the charging connection of the vehicle in which the intermediate circuit and the rectifier are located.

One embodiment provides that the rectifier GR and the intermediate circuit KS are arranged on the vehicle side and thus form a vehicle-based charging circuit.

The rectifier GR comprises three phase connections L1 to L3 and a neutral conductor connection as part of the AC voltage connection. Furthermore, the rectifier GR has three diode half-bridges D1 to D3. The rectifier is thus designed with three phases. Series inductances are shown by way of example between the diode half-bridges D1 to D3 and the associated phase connections L1 to L3, which enable the rectifier to also have a voltage-converting function. In particular, these allow the rectifier GR to be designed as a power factor correction filter.

The three diode half-bridges D1 to D3 (and the inductances also provided here) are part of the three phases of the rectifier circuit GR. Furthermore, two switches connected in anti-series with one another are provided for each phase, which together form a semiconductor switch for each phase. The anti-series orientation relates to the forward direction of the body diodes of the individual switching elements of the semiconductor switches S. Each diode half-bridge is connected via a semiconductor switch S to a common star point SP of the rectifier circuit GR. This star point SP is connected to the neutral conductor connection N of the AC voltage connection WA. A phase-correcting and/or voltage-converting function can be implemented by clocked switching of the semiconductor switches S together with the optional inductances shown. The diode half-bridges form a B6U bridge; alternatively, a B6C bridge can be provided. The rectifier circuit can thus have a fully or at least partially controllable half-bridge. The two potentials + and − are provided at the ends of the diode half-bridges, which are connected to the intermediate circuit KS via the first terminal connection A1. The semiconductor switches S and the individual phase connections L1 to L3 are connected (via the optional series inductances) to the connecting points of the diode half-bridges, which are referred to as center point.

In the case of three-phase charging, a multiphase voltage is applied to the phase connections L1 to L3, in particular voltages which are phase-shifted by 120° with respect to one another. In single-phase operation, a single AC voltage is applied to one of the phase connections L1 to L3 or to all phase connections L1 to L3 simultaneously with respect to the neutral conductor connection N. In the latter case, there is a lower rectified voltage at the terminal connection A1 than when a multiphase voltage is applied to the AC voltage connection WA.

The invention claimed is:

1. An intermediate circuit having a first terminal connection, which comprises a neutral conductor connection, and having a first circuit capacitor and a second intermediate circuit capacitor and also a diode circuit, wherein the intermediate circuit has configuration switches, which in a first state connects the first intermediate circuit capacitor to the second intermediate circuit capacitor in series and in a second state connects the first intermediate circuit capacitor in parallel with the second intermediate circuit capacitor, wherein the configuration switches are each designed as changeover switches, which bypass the diode circuit in the first state, and wherein the neutral conductor connection is connected to the diode circuit.

2. The intermediate circuit as claimed in claim 1, wherein the diode circuit comprises a series circuit of two diodes, which are connected to one another via a connecting point and the neutral conductor connection is connected to the connecting point.

3. The intermediate circuit as claimed in claim 1, wherein the first terminal connection has a positive potential and a negative potential, wherein one end of the first intermediate circuit capacitor is connected directly to the positive potential and one end of the second intermediate circuit capacitor is connected directly to the negative potential.

4. The intermediate circuit as claimed in claim 1, wherein the configuration switches in the first state connect one end of the first intermediate circuit capacitor directly to one end of the second intermediate circuit capacitor via a direct connection between the configuration switches and in the second state connect the end of the first intermediate circuit capacitor directly to a potential of the first terminal connection and connect the end of the second intermediate circuit capacitor directly to another potential of the first terminal connection.

5. The intermediate circuit as claimed in claim 1, wherein the diode circuit comprises a series circuit of two diodes, which are connected to one another via a connecting point, the neutral conductor connection is connected directly to the connecting point, and a direct connection, via which the configuration switches in the first state are connected to one another, is connected to the connecting point and to the neutral conductor connection.

6. The intermediate circuit as claimed in claim 1, having a second terminal connection, which is connected to two potentials of the first terminal connection.

7. A vehicle-based charging circuit having an intermediate circuit as claimed in claim 1 and a rectifier circuit, which is connected to the first terminal connection of the intermediate circuit, wherein the rectifier circuit has a multiphase AC voltage connection, which has a neutral conductor connection, which is connected to the neutral conductor connection of the intermediate circuit.

8. The vehicle-based charging circuit as claimed in claim 7, wherein the rectifier circuit has one diode half-bridge per phase.

9. The vehicle-based charging circuit as claimed in claim 7, wherein the rectifier circuit has a star point, which is connected to the neutral conductor connection of the intermediate circuit.

10. The vehicle-based charging circuit as claimed in claim 7, wherein the rectifier circuit has a plurality of diode half-bridges, which each have a center point, which is connected to the common star point of the rectifier circuit via a semiconductor switch.

11. The vehicle-based charging circuit as claimed in claim 7, wherein the rectifier circuit is set up to be operated in a single-phase or multiphase manner and the configuration switches of the intermediate circuit are set up to assume the first state during multiphase operation of the rectifier circuit and to assume the second state during single-phase operation of the rectifier circuit.

12. The intermediate circuit as claimed in claim 2, wherein the first terminal connection has a positive potential and a negative potential, wherein one end of the first intermediate circuit capacitor is connected directly to the positive potential and one end of the second intermediate circuit capacitor is connected directly to the negative potential.

13. The vehicle-based charging circuit as claimed in claim 8, wherein the rectifier circuit has a star point, which is connected to the neutral conductor connection of the intermediate circuit.

* * * * *